United States Patent
Colosimo et al.

(10) Patent No.: US 10,216,273 B2
(45) Date of Patent: Feb. 26, 2019

(54) APPARATUS AND METHOD FOR EFFECTING A CONTROL ACTION IN RESPECT OF SYSTEM FUNCTIONS

(71) Applicant: BAE Systems plc, London (GB)

(72) Inventors: Nicholas Giacomo Robert Colosimo, Preston (GB); Julian David Wright, Preston (GB); Christopher James Whiteford, Preston (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 15/552,662

(22) PCT Filed: Feb. 23, 2016

(86) PCT No.: PCT/GB2016/050454
§ 371 (c)(1),
(2) Date: Aug. 22, 2017

(87) PCT Pub. No.: WO2016/135473
PCT Pub. Date: Sep. 1, 2016

(65) Prior Publication Data
US 2018/0188806 A1    Jul. 5, 2018

(30) Foreign Application Priority Data

Feb. 25, 2015  (EP) ..................................... 15275043
Feb. 25, 2015  (GB) ..................................... 1503107.3

(51) Int. Cl.
*G06F 3/01* (2006.01)
*G06F 3/03* (2006.01)
*G06F 21/31* (2013.01)

(52) U.S. Cl.
CPC .............. *G06F 3/014* (2013.01); *G06F 3/011* (2013.01); *G06F 3/017* (2013.01); *G06F 3/0304* (2013.01); *G06F 21/31* (2013.01)

(58) Field of Classification Search
CPC .......... G06F 3/014; G06F 3/017; G06F 3/0304
See application file for complete search history.

(56) References Cited

U.S. PATENT DOCUMENTS

| 5,423,554 A | 6/1995 | Davis |
| 6,108,031 A | 8/2000 | King et al. |

(Continued)

FOREIGN PATENT DOCUMENTS

| EP | 0911647 A2 | 4/1999 |
| EP | 2189200 A1 | 5/2010 |

(Continued)

OTHER PUBLICATIONS

Kolsch et al., Touching the Visualized Invisibe: Wearable AR with a Multimodal Interface, Dec. 2006, p. 1-24.
International Preliminary Report on Patentability of International Application No. PCT/GB2016/050453, dated Aug. 29, 2017, 8 pages.

(Continued)

*Primary Examiner* — Ariel A Balaoing
(74) *Attorney, Agent, or Firm* — Maine Cernota & Rardin (57) ABSTRACT

An apparatus for effecting a control action in respect of a function within a virtual or mixed reality system, the control action corresponding to a predefined bodily movement of an authorized user of said function, wherein an authorized user is defined by a predetermined criterion in respect of a selected body part and/or a passive device carried thereon. The apparatus comprises a detection module for detecting a predefined bodily movement; a multi-spectral imaging system for capturing spectral reflectance and/or emission data at a plurality of wavelengths in respect of said selected body part and/or the passive device carried thereon; and an analysis module for comparing at least a portion of the spectral data with data corresponding to an authorized user of said function to determine if said criterion is met, and outputting a signal to effect said control action only if said criterion is met.

13 Claims, 3 Drawing Sheets

(56) References Cited

U.S. PATENT DOCUMENTS

| | | | |
|---|---|---|---|
| 6,215,498 | B1 | 4/2001 | Filo et al. |
| 7,180,476 | B1 | 2/2007 | Guell et al. |
| 8,179,604 | B1 | 5/2012 | Prada Gomez et al. |
| 9,380,270 | B1* | 6/2016 | Worley, III et al. ... A61B 1/041 |
| 2002/0080094 | A1 | 6/2002 | Biocca et al. |
| 2004/0193413 | A1 | 9/2004 | Wilson |
| 2005/0195128 | A1 | 9/2005 | Sefton |
| 2006/0050070 | A1 | 3/2006 | Matsui |
| 2007/0035561 | A1 | 2/2007 | Batchelder |
| 2007/0101279 | A1 | 5/2007 | Chaudhri |
| 2007/0247457 | A1 | 10/2007 | Gustafsson et al. |
| 2010/0110069 | A1 | 5/2010 | Yuan |
| 2011/0157016 | A1 | 6/2011 | Chang |
| 2011/0213664 | A1* | 9/2011 | Osterhout ............ G02B 27/017 705/14.58 |
| 2012/0015723 | A1 | 1/2012 | Lai |
| 2012/0115598 | A1 | 5/2012 | Hagstrom |
| 2012/0124516 | A1 | 5/2012 | Friedman |
| 2012/0188155 | A1* | 7/2012 | Eun ........................ H04N 5/232 345/156 |
| 2012/0249416 | A1 | 10/2012 | Maciocci et al. |
| 2012/0262558 | A1 | 10/2012 | Boger |
| 2013/0044912 | A1* | 2/2013 | Kulkarni ............ G06K 9/00671 382/103 |
| 2013/0050069 | A1 | 2/2013 | Ota |
| 2013/0249947 | A1 | 9/2013 | Reitan |
| 2013/0257899 | A1 | 10/2013 | Baron |
| 2014/0160165 | A1 | 6/2014 | Kim et al. |
| 2014/0180508 | A1 | 6/2014 | Zaneboni et al. |
| 2015/0092020 | A1 | 4/2015 | Vaughn |
| 2015/0161762 | A1 | 6/2015 | Fujiwara |
| 2017/0316613 | A1 | 11/2017 | Wright |

FOREIGN PATENT DOCUMENTS

| | | |
|---|---|---|
| EP | 2267588 A2 | 12/2010 |
| EP | 2456203 A1 | 5/2012 |
| EP | 2693255 A1 | 2/2014 |
| GB | 2376397 A | 12/2002 |
| WO | 0161672 A1 | 8/2001 |
| WO | 2011081283 A1 | 7/2011 |

OTHER PUBLICATIONS

International Preliminary Report on Patentability of International Application No. PCT/GB2016/050454, dated Aug. 29, 2017, 9 pages.

Search Report of Great Britain Patent Application No. GB1420572. 8, dated May 18, 2015, 4 pages.

International Search Report and Written Opinion of PCT Application No. PCT/GB2015/053394, dated Jan. 19, 2016, 12 pages.

Search Report of Great Britain Application No. GB1420570.2, dated May 15, 2015, 3 pages.

International Search Report and Written Opinion of PCT Application No. PCT/GB2015/053413, dated Jan. 8, 2016, 16 pages.

Huagen Wan et al: "MRStudio: A mixed reality display system for aircraft cockpit", VR Innovation (ISVRI), 2011 IEEE International Symposium on, IEEE, Mar. 19, 2011, pp. 129-135, XP031861038.

Search Report of Great Britain Application No. GB1420571.0, dated May 20, 2015, 4 pages.

International Search Report and Written Opinion of PCT Application No. PCT/GB2015/053398, dated Jan. 11, 2015, 16 pages.

Anonymous: "Head-mounted display", Oct. 24, 2014, pp. 1-8, XP055239689, Retrived from the internet: URL: htpps://en.wikipedia.org/w/index.php?title=Head-mounted_display&oldid=630962860.

International Preliminary Report on Patentability of PCT Application No. PCT/GB2015/053413, dated May 23, 2017, 10 pages.

International Preliminary Report on Patentability of PCT Application No. PCT/GB2015/053394, dated May 23, 2017, 9 pages.

International Preliminary Report on Patentability of PCT Application No. PCT/GB2015/053398, dated May 23, 2017, 10 pages.

International Search Report and Written Opinion of International Application No. PCT/GB2016/050453, dated Apr. 1, 2016, 13 pages.

Hongbin Gu et al: "Development of a Novel Low-Cost Flight Simulator for Pilot Training", National Journal of Mechanical, Aerospace, Industrial, Mechatronic and Manufacturing Engineering vol. 3, Np:12, 2009, Dec. 31, 2009, pp. 1-5, XP055242896.

European Search Report of European Application No. EP15182891, dated Jan. 21, 2016, 8 pages.

Search Report under Section 17(5) of Great Britain application No. GB1503115.6, dated Aug. 25, 2015, 3 pages.

\* cited by examiner

APPARATUS AND METHOD FOR EFFECTING A CONTROL ACTION IN RESPECT OF SYSTEM FUNCTIONS

RELATED APPLICATIONS

This application is a national phase application filed under 35 USC § 371 of PCT Application No. PCT/GB2016/050454 with an International filing date of Feb. 23, 2016 which claims priority of GB Patent Application 1503107.3 filed Feb. 25, 2015 and EP Patent Application 15275043.6 filed Feb. 25, 2015. Each of these applications is herein incorporated by reference in their entirety for all purposes.

FIELD

This invention relates generally to an apparatus and method for effecting one or more control actions in respect of system functions and, more particularly, to identifying control actions and verifying the authorisation of a user in respect of a function within a virtual or mixed reality system.

BACKGROUND

Virtual reality systems are known, comprising a headset which, when placed over a user's eyes, creates and displays a three dimensional virtual environment in which a user feels immersed and with which the user can interact in a manner dependent on the application. For example, the virtual environment created may comprise a game zone, within which a user can play a game.

More recently, virtual reality systems have been developed which enable "screens" of information, derived from multiple data sources, to be displayed within a three-dimensional virtual room, such that when a user places the headset over their eyes, they feel immersed within a virtual room having multiple data sources displayed simultaneously in three dimensions.

More recently, augmented and mixed reality systems have been developed, an image of a real world object can be captured, rendered and placed within a 3D virtual reality environment, such that it can be viewed and manipulated within that environment in the same way as virtual objects therein. Once again, it is envisaged, that data from one or more external data sources can be visually represented and placed within the virtual environment such that multiple data sources are displayed simultaneously in three dimensions.

In general, commands and control actions can be effected within the 3D virtual reality environment, in respect of the multiple data sources, by means of a number of different methods. One such method is by way of hand gestures, or other bodily movements, made by the user in respect of a selected function. However, problems may arise in the case where there are a number of different users of the system, some or all of which have different authorisations and permissions to access and/or manipulate the functions provided. When there are multiple people working in a close, collaborative environment, different people will be authorised for, and require, access to different functions and different security levels. Current methods of hand gesture detection are not able to distinguish between users and, therefore, cannot determine whether or not a user performing a particular hand gesture in respect of a selected function is permitted to access and/or manipulate that function. It would, therefore, be desirable to provide a method and apparatus for allowing an operator to access information and functions they need, whilst preventing the same operator from accessing functions or information for which they are not authorised, but for which another operator working in the same space is authorised and to which they require access.

SUMMARY

Aspects of the present invention seek to address this issue and, in accordance with a first aspect of the present invention, there is provided control apparatus for effecting a control action in respect of a function within a virtual or mixed reality system, said control action corresponding to a predefined bodily movement of an authorised user of said function, wherein an authorised user of said function is defined by a predetermined criterion in respect of a selected body part and/or a passive device carried thereon, the apparatus comprising:

a detection module for detecting a predefined bodily movement made by a user to effect a control action in respect of a selected function of said system;

a multi-spectral imaging system for capturing spectral reflectance and/or emission data at a plurality of wavelengths in respect of said selected body part of said user and/or a passive device carried thereon; and an analysis module for analysing said spectral data, comparing at least a portion thereof with predetermined data corresponding to an authorised user of said selected function to determine if said predetermined criterion for that function is met, and outputting a signal to effect said control action in respect of said selected function only if said predetermined criterion is met.

The above-mentioned body part may be a user's hand and said predefined bodily movement may be a predetermined hand gesture.

The detection module may include an image capture device for capturing images of users in respect of said virtual or mixed reality system, and wherein said detection module is configured to identify one or more predefined bodily movements of one or more said users.

In one exemplary embodiment, the apparatus may comprise a storage module having stored therein data representative of one or more spectra corresponding to respective one or more authorised users' body part(s) registered in respect of said virtual or mixed reality system, wherein said analysis module includes a matching module for, in response to detection of a predefined bodily movement of a user, receiving data representative of a spectrum derived from spectral reflectance and/or emission data captured by said multi-spectral imaging system in respect of said user's selected body part, comparing said data with said stored data to determine a match with that of a registered authorised user of a selected function in respect of which said bodily movement has been detected, wherein said analysis module is configured to output said signal to effect said control action in respect of said selected function only if a match is determined.

An authorised user of a function may be defined by a predetermined criterion in respect of a garment worn by said user, said garment having a predefined spectral characteristic.

The garment may comprise a glove worn on a user's hand, and said predefined bodily movement may be a predetermined hand gesture. The apparatus may comprise a storage module having stored therein data representative of one or more spectral characteristics corresponding to respective one or more authorised garments registered in respect of said virtual or mixed reality system, wherein said analysis module includes a matching module for, in response to detection of a predefined bodily movement of a user, receiving data representative of a spectrum derived from spectral reflectance and/or emission data captured by said multi-spectral imaging system in respect of said garment, comparing said data with said stored data to determine a match with that of a registered authorised garment for a selected function in respect of which said bodily movement has been detected, wherein said analysis module is configured to output said signal to effect said control action in respect of said selected function only if a match is determined.

In an alternative exemplary embodiment of the present invention, the apparatus may comprise a storage module having stored therein data representative of functions and spectral wavelengths corresponding thereto, wherein said analysis module comprises a comparison function for receiving data representative of a spectrum derived from spectral reflectance and/or emission data captured by said multi-spectral imaging system in respect of said garment, identifying from said storage module a spectral wavelength corresponding to a selected function in respect of which said bodily movement has been detected, comparing the spectral component of said data corresponding to said identified wavelength with a predetermined threshold, and outputting said signal to effect said control action in respect of said selected function only if the magnitude of said spectral component exceeds said predetermined threshold.

The apparatus may further comprise at least one image capture device for capturing images of users in respect of said virtual or mixed reality system, an image matching module for extracting images from said captured images corresponding to predefined bodily movements of one or more of said users and identifying, from said extracted images, a predefined bodily movement in respect of a selected function.

Another aspect of the present invention extends to a mixed reality system comprising a headset for placing over a user's eyes, in use, said headset including a screen, the system further comprising a processor configured to receive data from one or more sources and display said data on said screen within a three-dimensional virtual environment, wherein said system facilitates a plurality of selective functions in respect of said data, said selected functions being actuable by a respective control action corresponding to a predefined bodily movement of an authorised user of said function, the system further comprising control apparatus according to any of claims 1 to 9 for effecting a said control action.

Yet another aspect of the present invention extends to a method of controlling access to functions and/or information within a virtual or mixed reality system, said control action corresponding to a predefined bodily movement of an authorised user of said function, wherein an authorised user of said function is defined by a predetermined criterion in respect of a selected body part and/or a passive device carried thereon, the method comprising providing a detection module for detecting a predefined bodily movement made by a user to effect a control action in respect of a selected function of said system; providing a multi-spectral imaging system for capturing spectral reflectance and/or emission data at a plurality of wavelengths in respect of said selected body part of said user and/or a passive device carried thereon; and configuring an analysis module to analyse said spectral data by comparing at least a portion thereof with predetermined data corresponding to an authorised user of said selected function to determine if said predetermined criterion for that function is met, and outputting a signal to effect said control action in respect of said selected function only if said predetermined criterion is met.

BRIEF DESCRIPTION OF THE DRAWINGS

These and other aspects of the present invention will become apparent from the following specific description of exemplary embodiments of the present invention, which are described by way of examples only with reference to the accompanying drawings, in which.

DETAILED DESCRIPTION

Figure 1:
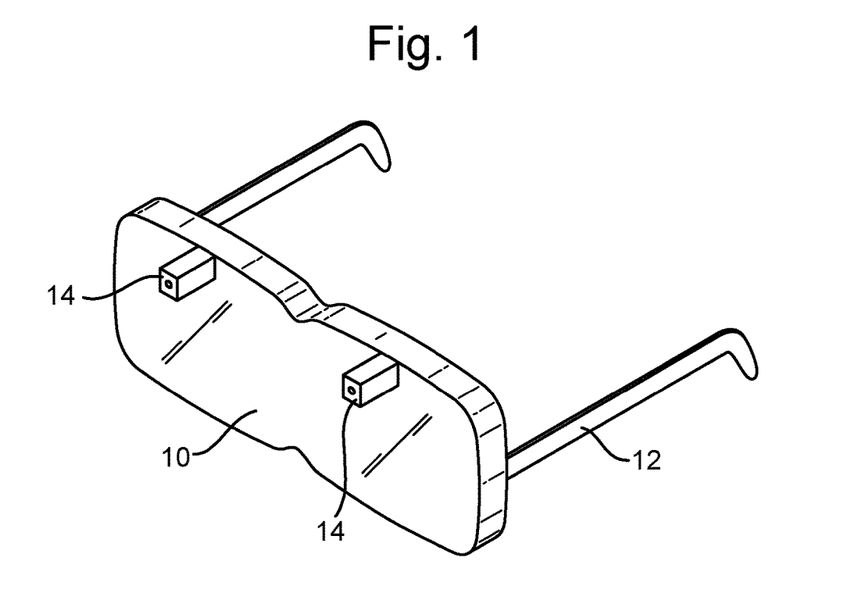
FIG. 1 is a front perspective view of a headset for use in a system according to an exemplary embodiment of the present invention.

Referring to FIG. 1 of the drawings, a system according to a present invention may comprise a headset comprising a visor 10 having a pair of arms 12 hingedly attached at opposing sides thereof in order to allow the visor to be secured onto a user's head, over their eyes, in use, by placing the curved ends of the arms 12 over and behind the user's ears, in a manner similar to conventional spectacles. It will be appreciated that, whilst the headset is illustrated herein in the form of a visor, it may alternatively comprise a helmet for placing over a user's head, or even a pair of contact lenses or the like, for placing within the user's eyes, and the present invention is not intended to be in any way limited in this regard. Also provided on the headset, is a pair of image capture devices 14 for capturing images of the environment, such image capture devices being mounted roughly aligned with a user's eyes in use.

The system of the present invention further comprises a processor, which is communicably connected in some way to a screen which provided inside the visor 10. Such communicable connection may be a hard wired electrical connection, in which case the processor and associated circuitry will also be mounted on the headset. However, in an alternative exemplary embodiment, the processor may be configured to wirelessly communicate with the visor, for example, by means of Bluetooth or similar wireless communication protocol, in which case, the processor need not be mounted on the headset but can instead be located remotely from the headset, with the relative allowable distance between them being dictated and limited only by the wireless communication protocol being employed. For example, the processor could be mounted on or formed integrally with the user's clothing, or instead located remotely from the user, either as a stand-alone unit or as an integral part of a larger control unit, for example.

Figure 2:
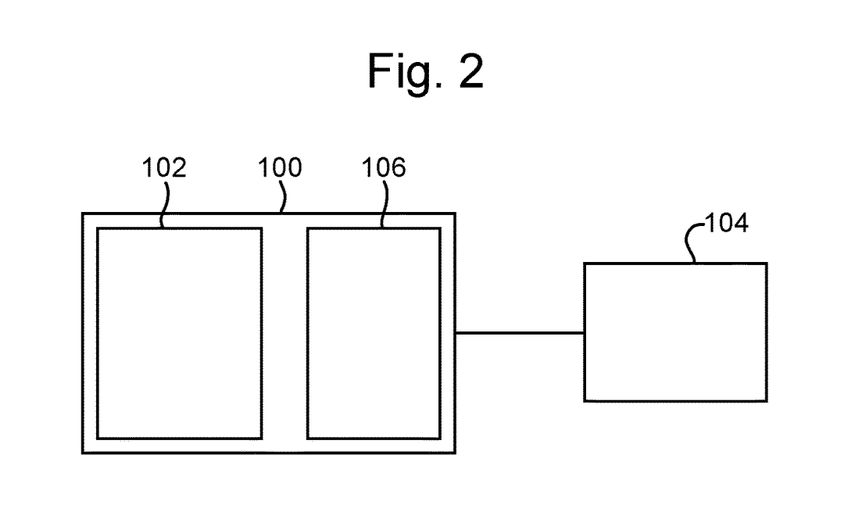
FIG. 2 is a schematic block diagram of a system according to an exemplary embodiment of the present invention.

Referring to FIG. 2 of the drawings, a system according to an exemplary embodiment of the invention comprises, generally, a headset 100, incorporating a screen 102, a processor 104, and a pair of external digital image capture devices (only one shown) 106.

The processor 104 is configured to display multiple data items simultaneously within a three dimensional virtual environment. Such data items may be received from several different sources, via, for example, an Internet connection, a secure LAN, Bluetooth, or any other communications protocol, which may be wireless or otherwise.

The general concept of real time image blending for augmented reality is known, and several different techniques have been proposed. The present invention is not intended to be in any way limited in this regard. However, for completeness, one exemplary method for image blending will be briefly described. Thus, once an object has been selected from a real world image to be blended into the virtual environment, a threshold function may be applied in order to extract that object from the background image. Its relative location and orientation may also be extracted and preserved by means of marker data. Next, the image and marker data is converted to a binary image, possibly by means of adaptive thresholding (although other methods are known). The marker data and binary image are then transformed into a set of coordinates which match the location within the virtual environment in which they will be blended. Such blending is usually performed in using black and white image data. Thus, if necessary, colour data sampled from the source image is can be backward warped, using homography, to each pixel in the resultant virtual scene. All of these computational steps require minimal processing capacity and time and can, therefore, be performed quickly and in real time. Thus, if the selected object is moving, for example, a person, the corresponding image data within the virtual environment can be updated in real time.

The data feeds from external sources, such as remote computing devices, can be represented in the virtual environment in any desired manner, for example, they may simply appear as screens or images of the computing devices themselves, and located as required within the three dimensional virtual environment. In accordance with an exemplary embodiment of the present invention, the human hand is considered to be a convenient method for accessing functions and information within a collaborative environment of the type envisaged. However, if a user wishes to manipulate any of the data items or perform an action in respect of one of the computing devices from which data is being fed, hand gestures (or other bodily movements may be used), which movements or gestures are captured by an image capture device. An image recognition technique may then be used in respect of the captured images in order to identify the gesture or movement made, and effect the control action associated therewith in respect of the selected data or function.

Several different techniques for automated recognition of hand gestures are known, and the present invention is not in any way intended to be limited in this regard. It will be appreciated that the image capturing module provided in the system described above can be used to capture video images of the user's hands. Thus, one relatively simple method of automated hand gesture recognition and control using captured digital video images involves the use of a database of images of predefined hand gestures and the command to which they relate. Thus, an auto threshold function is first performed on the image to extract the hand from the background. The wrist is then removed from the hand shape, using a so-called "blob" image superposed over the palm of the hand, to separate out the individual parts of the hand so that the edge of the blob defines the border of the image. The parts outside of the border (i.e. the wrist) are then removed from the image, following which shape recognition software can be used to extract and match the shape of the hand to a predefined hand gesture, and call the associated command accordingly.

However, as stated above, known image recognition techniques are unable to distinguish between users' hands without additional information and/or significant additional image capture and processing in order to identify the user themselves, as well as the hand gesture made. Thus, in the case where there are multiple users of a system, all potentially having access to the same data sources but having different permissions in respect thereof, data may be compromised in the event that a user accesses or manipulates data in respect of a function for which they are not authorised or do not have the necessary permissions.

Thus, in accordance with an aspect of the present invention, a multi-spectral or hyperspectral imaging system is additionally provided. In one exemplary embodiment, a multi-spectral or hyperspectral imaging device may be provided on each user's headset which is configured to transmit data therefrom to a remote central processing unit. However, in an alternative exemplary embodiment, one or more multi-spectral or hyperspectral imaging systems may be provided within the real world environment in which the users are operating which is/are configured to capture spectral images from any location within a predefined area.

It is known that different materials and objects reflect and emit electromagnetic radiation at different wavelengths. Hyperspectral imaging is a known technique which comprises collecting, using a sensor, images of objects within a field of view at multiple wavelengths of the electromagnetic spectrum. As a result, each pixel of a multi-spectral or hyperspectral image comprises a spectrum consisting of a plurality of intensity values at each of a plurality of respective wavelengths or wavelength bands. The spectrum of each such pixel can then be analysed in order to determine characteristics and constitution of an object observed within the pixel.

In accordance with an exemplary embodiment of the present invention, each user is required to wear a glove of a specific colour, wherein the colour of the glove determines the permissions of the wearer in respect of the functions and data within the system. The following example will refer specifically to red and blue gloves, by way of example only, and it will be appreciated by a person skilled in the art that gloves (or other garments or passive objects) of different colours or chromatic characteristics can be used, and the present invention is not necessarily intended to be limited in this regard. Furthermore, it will be appreciated that the present invention is not necessarily intended to be limited in respect of the number of different types of glove (or other garment or passive device) that can be used within a system of this type. This will be dependent on the number of different permission levels required to be accommodated, amongst other things.

Figure 3:
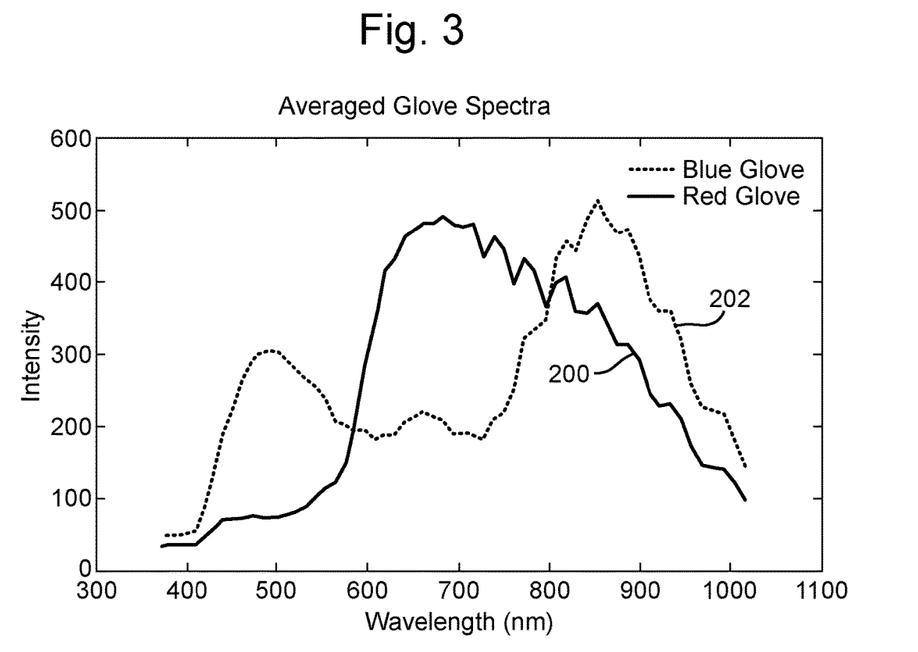
FIG. 3 is a graphical representation of the spectra of a red glove and a blue glove.

Thus, referring to FIG. 3 of the drawings, the spectra of a red glove 200 and a blue glove 202 are illustrated graphically. It can be seen that their respective spectral characteristics, as captured by a multi-spectral or hyperspectral imaging system, are very different and can therefore be distinguished from each other thereby. Thus, in this exemplary embodiment of the invention, it is proposed that the reflectance spectrum of a gloved hand be used to provide selective access to information and/or functions within a mixed reality system.

As discussed above, other data sources, such as image capture devices and associated image recognition modules can be used to identify users' hands within a predefined area, and identify the position and orientation of a hand within that environment, in order to recognise a predefined hand gesture in respect of a selected control action. Hyperspectral or multispectral cameras (hereinafter referred to as "spectral cameras") may then be used to capture spectral images of the hands and also to track their movement within the predefined area. Thus, the spectrum of each hand can be continually monitored and used to provide a "key" to accessing information or functions, such that the spectrum of the hand (or glove) will provide a 'key' and physical button functionality in the form of a hand gesture for activating a function or accessing information.

In the following, two specific methods for using the spectrum of a hand (or glove) to act as an access key are proposed by way of examples only.

In a first exemplary method, spectral matching may be employed. In this case, the spectra ("target signatures") of each authorised hand (or glove) is registered in a central storage module, to act as a filter. In use, the image capture and matching modules identify hands (or gloved hands) within a working environment and track their movements. The spectra from those hands are captured, and a matched filter may be used in respect of the data stored in the storage module to determine a) if an identified hand (or glove) is registered as authorised for the working environment, and b) if so, the permissions assigned to it; and assign those permissions accordingly. Any one of a number of spectral matching methods can be used in this regard, such as Spectral Angle Mapping (SAM) or Adaptive Coherence Estimator (ACE), for detecting occurrences of target signatures.

For example, and referring back to FIG. 3 of the drawings, it can be seen that the spectral signatures of a red glove and a blue glove are very different, and readily distinguishable. Thus, the storage module may store the spectral signature of each glove type together with a respective set of authorised functions and access permissions in respect of the mixed reality environment. Then, if a red glove attempts to access a function for which only a blue glove is registered as authorised, its reflectance spectrum will not match the target signature registered for that function and the user will be denied the requested access accordingly. Additional security can be provided by providing for a time limit as how long a target signature is valid for, such that, for example, access would be prevented after a selected operative's shift has finished.

Figure 4:
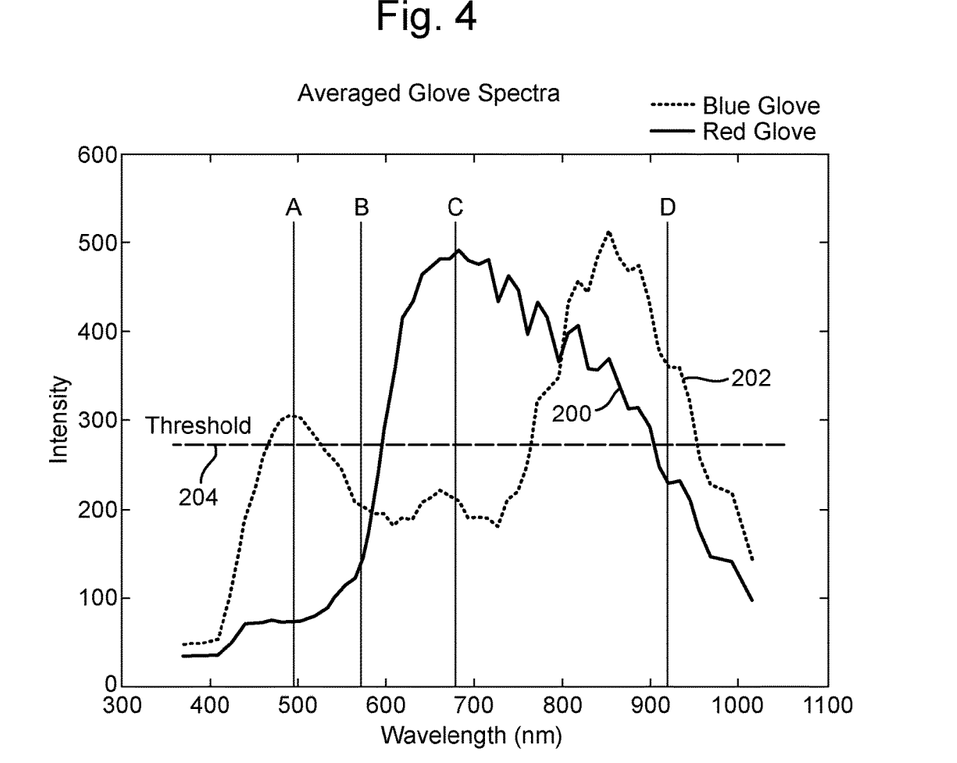
FIG. 4 is a graphical representation of the spectra of a red glove and a blue glove, illustrative of a manner in which permissions in respect of respective functions can be verified in accordance with an exemplary method of the present invention.

In an alternative exemplary embodiment of the invention, band access may be used to provide the necessary access control. In this case, different wavelengths can be assigned to different levels of information and different functions within the system. Referring to FIG. 4 of the drawings, for example, a first function A may be assigned the wavelength 495 nm, a second function B may be assigned to 570 nm, a third function C may be assigned to 680 nm and a fourth function D may be assigned to 920 nm. Then, if a user attempts to access one of the functions, the reflectance spectrum of their gloved hand is compared against a threshold value 204 and, only if the intensity of the spectrum is above that threshold at the wavelength assigned to the selected function, will the user be allowed to perform the requested function. In this case, therefore, and in respect of the spectra or target signatures corresponding to a red 200 and blue glove 202 respectively, it can be seen that an operator using a blue glove can access functions A and D, but not B and C, and an operator wearing a red glove can only access function C, but none of the others. It will be appreciated, of course, that each available function within the system need not be allocated a single wavelength, but may instead be allocated multiple wavelengths or even an area of the electromagnetic spectrum, and the present invention is not necessarily intended to be limited in this regard.

As stated above, one or more spectral cameras are required in respect of embodiments of the present invention in order to monitor the working environment of a system. Such spectral cameras may be provided on individual respective headsets, but may instead be mounted at convenient locations around the real world environment in which the users are working. Furthermore, and as stated above, technologies such as image capture and recognition can be used to determine the location of hands within the field of view of the hyperspectral cameras. This, in turn, will determine which pixels are representative of the hand. Alternatively, however, the spectral cameras, or the outputs of the processed images therefrom, could also be used to determine the location of the hands.

It will be appreciated by a person skilled in the art that modifications and variations can be made to the described embodiments without departing from the scope of the invention as claimed. For the avoidance of doubt, it will be understood by a person skilled in the art that the present invention is not necessarily intended to be limited to use with coloured garments such as gloves and the like: it is envisaged that exemplary embodiments of the present invention may be provided which can differentiate between users' skin signatures, rather than the broad colour signature of a garment, and the present invention is therefore not necessarily intended to be limited in this regard.

What is claimed is:

1. A control apparatus for effecting a control action in respect of a function within a virtual or mixed reality system, said control action corresponding to a predefined bodily movement of an authorised user of said function, wherein an authorised user of said function is defined by a predetermined criterion in respect of a selected body part and/or a passive device carried thereon;

said authorised user of said function further defined by a predetermined criterion in respect of a garment worn by said user, said garment having a predefined spectral characteristic;

the apparatus comprising:

a detection module for detecting a predefined bodily movement made by a user to effect a control action in respect of a selected function of said system;

a storage module having stored therein data representative of one or more spectral characteristics corresponding to respective one or more authorised garments registered in respect of said virtual or mixed reality system;

a multi-spectral imaging system for capturing spectral reflectance and/or emission data at a plurality of wavelengths in respect of said selected body part of said user and/or a passive device carried thereon; and an analysis module for analysing said spectral data, comparing at least a portion thereof with predetermined data corresponding to an authorised user of said selected function to determine if said predetermined criterion for that function is met, and outputting a signal to effect said control action in respect of said selected function only if said predetermined criterion is met;

wherein said analysis module includes a matching module for, in response to detection of a predefined bodily movement of a user;

receiving data representative of a spectrum derived from spectral reflectance and/or emission data captured by said multi-spectral imaging system in respect of said garment;

comparing said data with said stored data to determine a match with that of a registered authorised garment for a selected function in respect of which said bodily movement has been detected;

wherein said analysis module is configured to output said signal to effect said control action in respect of said selected function only if a match is determined.

2. The apparatus according to claim 1, wherein said body part is a user's hand and said predefined bodily movement is a predetermined hand gesture.

3. The apparatus according to claim 1, wherein said detection module includes an image capture device for capturing images of users in respect of said virtual or mixed reality system, and wherein said detection module is configured to identify one or more predefined bodily movements of one or more said users.

4. The apparatus according to claim 1, comprising:
said storage module having stored therein data representative of one or more spectra corresponding to respective one or more authorised users' body part(s) registered in respect of said virtual or mixed reality system;
wherein said analysis module includes a matching module for, in response to detection of a predefined bodily movement of a user, receiving data representative of a spectrum derived from spectral reflectance and/or emission data captured by said multi-spectral imaging system in respect of said user's selected body part;
comparing said data with said stored data to determine a match with that of a registered authorised user of a selected function in respect of which said bodily movement has been detected;
wherein said analysis module is configured to output said signal to effect said control action in respect of said selected function only if a match is determined.

5. The apparatus according to claim 1, wherein said garment is a glove worn on a user's hand, and said predefined bodily movement is a predetermined hand gesture.

6. The apparatus according to claim 1, further comprising:
at least one image capture device for capturing images of users in respect of said virtual or mixed reality system;
an image matching module for extracting images from said captured images corresponding to predefined bodily movements of one or more said users; and
identifying, from said extracted images, a predefined bodily movement in respect of a selected function.

7. A mixed reality system comprising:
a headset for placing over a user's eyes, in use, said headset including a screen, the system further comprising
a processor configured to receive data from one or more sources and display said data on said screen within a three-dimensional virtual environment;
wherein said system facilitates a plurality of selective functions in respect of said data, said selected functions being actuable by a respective control action corresponding to a predefined bodily movement of an authorised user of said function, the system further comprising;
a control apparatus for effecting a control action in respect of a function within said mixed reality system, said control action corresponding to a predefined bodily movement of an authorised user of said function, wherein an authorised user of said function is defined by a predetermined criterion in respect of a selected body part and/or a passive device carried thereon, the apparatus comprising:

a detection module for detecting a predefined bodily movement made by a user to effect a control action in respect of a selected function of said system;
a multi-spectral imaging system for capturing spectral reflectance and/or emission data at a plurality of wavelengths in respect of said selected body part of said user and/or a passive device carried thereon; and
an analysis module for analysing said spectral data, comparing at least a portion thereof with predetermined data corresponding to an authorised user of said selected function to determine if said predetermined criterion for that function is met, and outputting a signal to effect said control action in respect of said selected function only if said predetermined criterion is met;
wherein an authorised user of said function is defined by a predetermined criterion in respect of a garment worn by said user, said garment having a predefined spectral characteristic;
a storage module having stored therein data representative of functions and spectral wavelengths corresponding thereto;
wherein said analysis module comprises a comparison function for receiving data representative of a spectrum derived from spectral reflectance and/or emission data captured by said multi-spectral imaging system in respect of said garment;
identifying from said storage module a spectral wavelength corresponding to a selected function in respect of which said bodily movement has been detected;
comparing the spectral component of said data corresponding to said identified wavelength with a predetermined threshold; and
outputting said signal to effect said control action in respect of said selected function only if the magnitude of said spectral component exceeds said predetermined threshold.

8. A method of controlling access to functions and/or information within a virtual or mixed reality system, said control action corresponding to a predefined bodily movement of an authorised user of said function, wherein an authorised user of said function is defined by a predetermined criterion in respect of a selected body part and/or a passive device carried thereon, the method comprising:
providing a detection module for detecting a predefined bodily movement made by a user to effect a control action in respect of a selected function of said system;
providing a multi-spectral imaging system for capturing spectral reflectance and/or emission data at a plurality of wavelengths in respect of said selected body part of said user and/or a passive device carried thereon; and
configuring an analysis module to analyse said spectral data by comparing at least a portion thereof with predetermined data corresponding to an authorised user of said selected function to determine if said predetermined criterion for that function is met, and outputting a signal to effect said control action in respect of said selected function only if said predetermined criterion is met;
wherein an authorised user of said function is defined by a predetermined criterion in respect of a garment worn by said user, said garment having a predefined spectral characteristic;
a storage module having stored therein data representative of functions and spectral wavelengths corresponding thereto;
wherein said analysis module comprises a comparison function for receiving data representative of a spectrum derived from spectral reflectance and/or emission data captured by said multi-spectral imaging system in respect of said garment;

identifying from said storage module a spectral wavelength corresponding to a selected function in respect of which said bodily movement has been detected;

comparing the spectral component of said data corresponding to said identified wavelength with a predetermined threshold; and outputting said signal to effect said control action in respect of said selected function only if the magnitude of said spectral component exceeds said predetermined threshold.

9. The system according to claim 7, wherein said body part is a user's hand and said predefined bodily movement is a predetermined hand gesture.

10. The system according to claim 7, wherein said detection module includes an image capture device for capturing images of users in respect of said virtual or mixed reality system, and wherein said detection module is configured to identify one or more predefined bodily movements of one or more said users.

11. The system according to claim 7, comprising:

a storage module having stored therein data representative of one or more spectra corresponding to respective one or more authorised users' body part(s) registered in respect of said virtual or mixed reality system;

wherein said analysis module includes a matching module for, in response to detection of a predefined bodily movement of a user, receiving data representative of a spectrum derived from spectral reflectance and/or emission data captured by said multi-spectral imaging system in respect of said user's selected body part;

comparing said data with said stored data to determine a match with that of a registered authorised user of a selected function in respect of which said bodily movement has been detected;

wherein said analysis module is configured to output said signal to effect said control action in respect of said selected function only if a match is determined.

12. The system according to claim 7, wherein said garment is a glove worn on a user's hand, and said predefined bodily movement is a predetermined hand gesture.

13. The system according to claim 7, further comprising:

at least one image capture device for capturing images of users in respect of said virtual or mixed reality system;

an image matching module for extracting images from said captured images corresponding to predefined bodily movements of one or more of said users; and identifying, from said extracted images, a predefined bodily movement in respect of a selected function.

* * * * *